United States Patent [19]

Oldendorf et al.

[11] Patent Number: 4,907,179
[45] Date of Patent: Mar. 6, 1990

[54] ELECTRONIC BALANCE WITH QUASI ANALOG AND DIGITAL DISPLAY

[75] Inventors: Christian Oldendorf, Göttingen; Franz-Josef Melcher, Hardegsen; Christoph Berg, Adelebsen, all of Fed. Rep. of Germany

[73] Assignee: Sartorius GmbH, Fed. Rep. of Germany

[21] Appl. No.: 155,602

[22] Filed: Feb. 12, 1988

[30] Foreign Application Priority Data

Mar. 9, 1987 [DE] Fed. Rep. of Germany ....... 3707543

[51] Int. Cl.$^4$ ................ G01G 23/16; G01G 23/36
[52] U.S. Cl. .................... 364/567; 177/25.13; 177/DIG. 3
[58] Field of Search ............ 364/567, 570, 568; 177/165, DIG. 3, 25.11, 25.12, 25.13; 340/756, 762

[56] References Cited

U.S. PATENT DOCUMENTS

| | | | |
|---|---|---|---|
| 4,036,316 | 7/1977 | Rock | 177/1 |
| 4,055,748 | 10/1977 | Boshinski et al. | 177/6 |
| 4,200,896 | 4/1980 | Baumann | 177/177 |
| 4,375,838 | 3/1983 | Yano et al. | 364/567 |
| 4,417,631 | 11/1983 | Johnson | 364/567 |
| 4,447,885 | 5/1984 | Biss | 364/567 |
| 4,645,021 | 2/1987 | Knothe et al. | 177/70 |
| 4,650,014 | 3/1987 | Oldendorf et al. | 177/177 |
| 4,723,613 | 2/1988 | Garlen et al. | 177/164 |

Primary Examiner—Felix D. Gruber
Attorney, Agent, or Firm—Eric P. Schellin

[57] ABSTRACT

An electronic balance with a digital display for the exact display of the weighing result, with an quasi analog display for the estimated display of the balance (gross) load, whereby the a quasi analog display consists of at least one horizontal band of activatable points (7), and with a taring operation, that suitable activatable segments (8, 10) be located within, directly above or directly below the first horizontal band of activatable points (7) with which such suitable segments a "T" symbol (9) can be activated at a plurality of positions along the first horizontal band and that the "T: symbol be activated during taring at the horizontal position which corresponds to said tare weight on the horizontal band (7) of the quasi analog display while a horizontal bar formed by suitable activation of activatable points indicates gross weight. This makes it possible to display in a simple manner the relative position at which taring was performed. Still other segments (8, 10') can also be used in an advantageous manner as a scale for the quasi analog display.

9 Claims, 3 Drawing Sheets

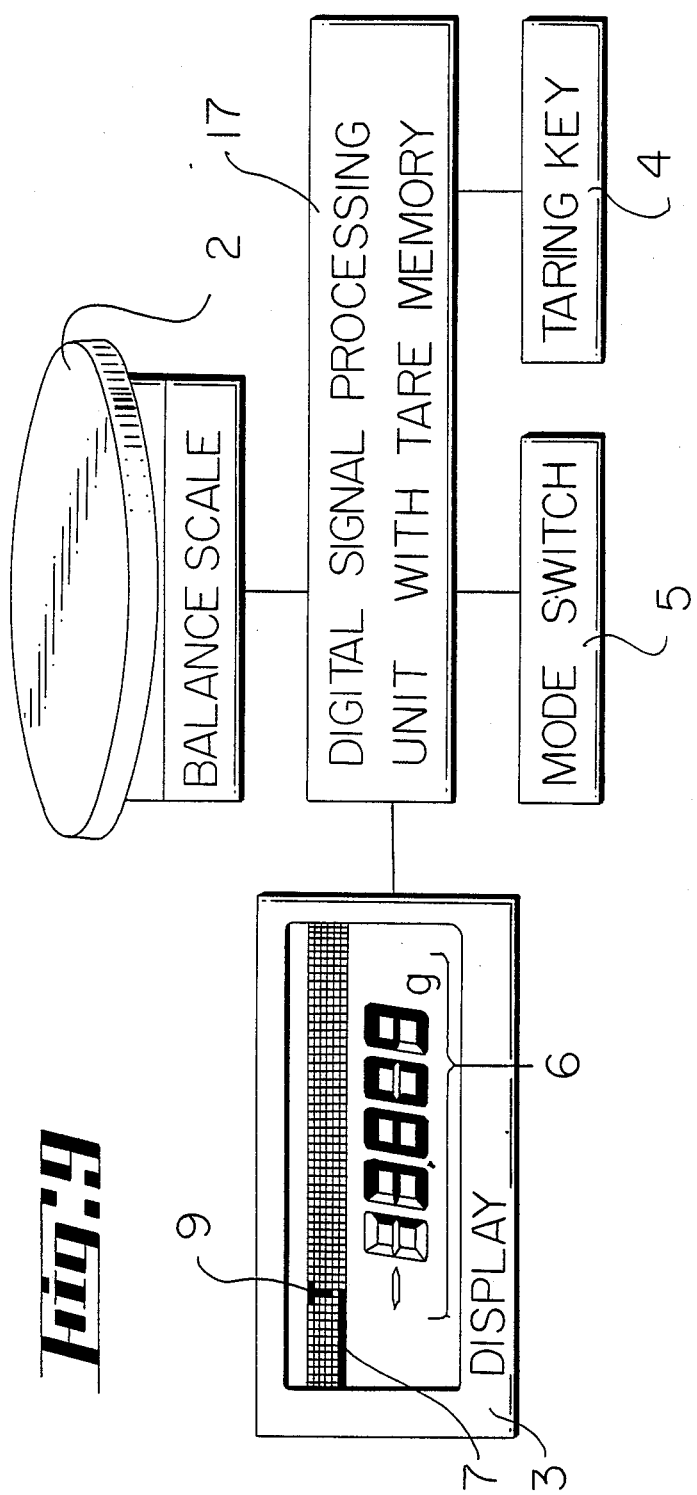

ELECTRONIC BALANCE WITH QUASI ANALOG AND DIGITAL DISPLAY

BACKGROUND OF THE INVENTION

The invention relates to an electronic balance with a digital display for the exact display of the weighing result, with a digital multi-segment display for the estimated quasi-analog display of the balance load, whereby the quasi-analog display consists of at least one horizontal band of activatable points having at least one segment for each vertical "line" of multi-segments comprising a horizontal band, and with a digital signal processing unit which controls the digital display and the quasi-analog display and which also displays taring bases and gross weight on the same horizontal scale.

Balances of this type are known e.g. from DE-OS No. 26 04 747.

A disadvantage of the known balances is the fact that the operator only receives information about the gross value on the balance in the analog display. Therefore, DE-OS No. 25 36 045 has already suggested positioning two analog displays adjacent to one another, of which the one displays the gross value and the other the tare value. The net value can then be estimated from the differences of the two analog displays. A disadvantage of this solution is the great expense for the second analog display and the danger of confusing the gross display and the tare display, especially if one considers that negative net values (removal from a filled tare vessel) also occur.

A digital signal processing unit controls a digital display and a quasi-analog display, the quasi-analog display comprising a horizontal band of activatable points and other activatable points directly above or directly below said horizontal band, and which also offers the ability to memorize the tare weight during taring and display a "T" symbol along said horizontal band and said "T" symbol is activated during taring at the horizontal position on said band which corresponds to said tare weight, as referenced in DE-OS No. 25 30 045 above at page 5 re: "Tarawertanzeige 17" (tare value display 17) and page 6 line 2 "Tarawert" (tare value). Note that operation of button 22 causes taring, i.e. weighing whatever is on the balance and storing its weight in a tare memory. Also see applicants' U.S. Pat. No. 4,650,014 filed Dec. 13, 1985 at column 2 lines 45–56 and column 4 lines 9–14 and 55–64. Note use of "tare memory" term.

The invention therefore has the task of indicating a quasi analog display for an electronic balance which permits, in addition to the gross display, a simple and unambiguous quasi-analog display of the tare value.

SUMMARY OF THE INVENTION

The invention solves this task as follows: Other activatable segments are located within directly above or directly below a horizontal band of activatable points with which suitable segments a "T" symbol can be activated at a plurality of positions along the horizontal band whereby the "T" symbol is activated during taring at the relative horizontal position which corresponds to the tare weight on the horizontal band of the quasi-analog display. [FIGS. 7, 8]

Thus, the tare value is displayed by the position of the "T" symbol. The net value results from the difference of the position of the "T" symbol and the end of the horizontal band of activated points (horizontal bar). In the case of a positive net value, the activated horizontal band (bar) extends past the position of the "T" symbol and in the case of a negative net value, the horizontal band (bar) does not extend to the "T" symbol. Thus, positive and negative net values can be distinguished without danger of confusion.

In another advantageous embodiment the "T" symbol is composed of a vertical line and several points located in a separate horizontal row. These points located in said horizontal row can form a second horizontal band in an advantageous manner, so that there is the additional possibility of a second quasi-analog display component. The vertical lines for the "T" symbol can be used in an advantageous further development as scale marks for the horizontal band of the analog display, whereby these scale marks can be faded out in the vicinity of the activated points of the "T" symbol in order that the "T" symbol stands out better. It is understood that although the term "horizontal" is used that the invention encompasses vertical inclination positioning and any inclination of "horizontal band".

BRIEF DESCRIPTION OF THE DRAWINGS

The invention is described in the following with reference made to the schematic drawings.

FIG. 9 shows a functional description of the system shown in FIG. 1.

DETAILED DESCRIPTION OF THE INVENTION

Figure 1:
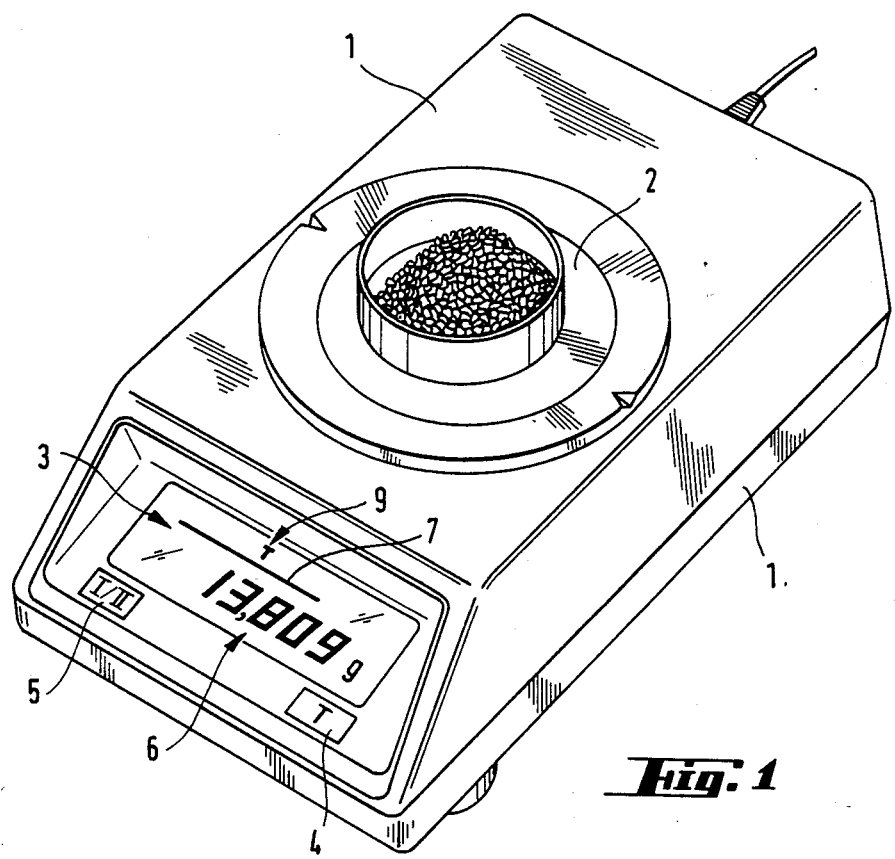
FIG. 1 shows a perspective view of the balance with digital display and quasi-analog display.

The electronic balance of FIG. 1 consists of a housing 1, balance scale 2, display 3 and operating keys 4, 5. Key 4 is used for taring and key 5 e.g. for switching between two weighing ranges or for switching between two measuring units. Display 3 comprises digital display 6 and a quasi-analog display in the form of a horizontal band 7 whose suitable activated points form a bar representing gross weight.

Figure 2:
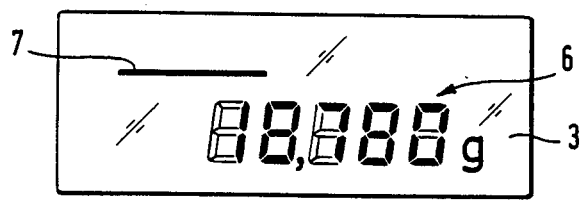
FIG. 2 shows the display of the balance of FIG. 1 when loaded only with a tare vessel.

Display 3 is shown again in FIGS. 2 to 5 for different loads on the balance scale: If only the empty vessel is placed on the scale first, then digital display 6 displays its weight of 18,780 g and the quasi-analog display displays a horizontal band (bar) 7 whose length likewise corresponds to the weight of the vessel (FIG. 2). If the weight of the vessel is now tared by means of activating tare key 4, the display changes according to FIG. 3: Digital display 6 displays "0.000 g", and the length of band (bar) 7 of the quasi-analog display remains unchanged since the quasi-analog display shows the gross value. In order to display the taring process which occurred, a "T" symbol 9 appears above band (bar) 7 of the quasi-analog display exactly at the position at which band (bar) 7 of the quasi-analog display ended during taring. If material to be weighed is now put in the vessel, digital display 6 displays the weight of the material to be weighed of e.g 13,809 g, band (bar) 7 of the quasi-analog display moves further corresponding to the greater gross load and the "T" symbol 9 remains unchanged at the old position. This state, shown in FIG. 4, corresponds to the state in FIG. 1. If taring is performed again, for example, in order to weigh a second substance, then digital display 6 would again display 0.000 g, the length of band (bar) 7 of the quasi-analog display would remain unchanged and the "T" symbol at the position shown in FIGS. 3, 4 would disappear and appear instead at the end of band bar 7 corresponding to the new gross load. This process can be repeated as often as desired until the total weighing range of the balance has been reached.

Figure 3:
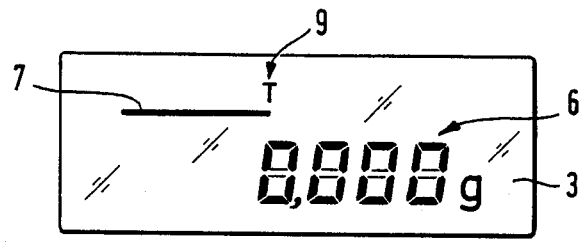
FIG. 3 shows the display of the balance of FIG. 1 after taring.
Figure 4:
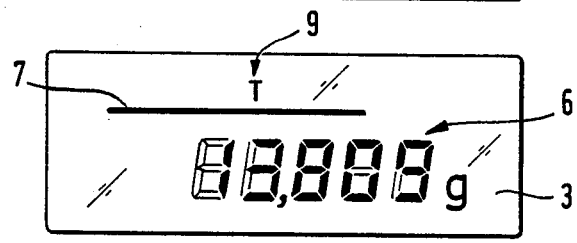
FIG. 4 shows the display of the balance of FIG. 1 with additional material to be weighed (this is the state shown in FIG. 1).
Figure 5:
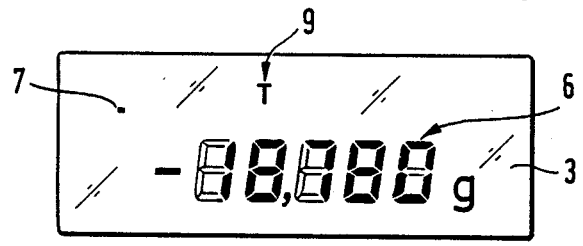
FIG. 5 shows the display of the balance of FIG. 1 after removal of the filled vessel.

FIG. 5 shows display 3 again when the scale, starting with the state of FIG. 3, has been entirely relieved of its load by removing the vessel. Since the balance had been tared with an empty vessel, digital display 6 displays the negative vessel weight, band (bar) 7 of the quasi-analog display has gone entirely back to its zero position and "T" symbol 9 remains at the old position. If a taring is again performed subsequently, then the digital display jumps to "0.000 g", band bar 7 of the quasi-analog display remains in its zero position and "T" symbol 9 disappears (no "T" symbol is activated at gross load 0).

Figure 6:
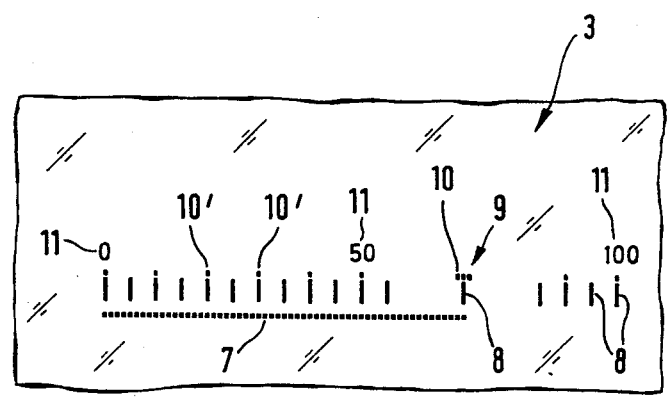
FIG. 6 shows the quasi-analog display of the balance in another embodiment.

FIG. 6 shows a quasi-analog display 7 again in another embodiment. Here the individual "T" symbols are composed of vertical points 8 and points 10 which form a horizontal band. The "T" symbol can be activated by activating a vertical point 8 and three adjacent points 10. Vertical lines are activated at the positions which correspond to legend or scale indications of 5%, 10%, 15%, etc. of the weighing range and positions which correspond to 10%, 20%, 30% etc. of the weighing range, the adjacent point 10' from the point band for representing the transverse line of the "T" symbol is activated, so that these lines are longer and make possible an easier orientation. Additional displayed numbers or numerals 11 can improve the quantitative clarity of the quasi-analog display even more. If no "T" symbol is activated, the complete scale is activated; however, if a "T" symbol 9 is activated, the scale lines in the vicinity of "T" symbol 9 are not activated, as shown in FIG. 6, so that "T" symbol 9 stands out more distinctly.

Figure 7:
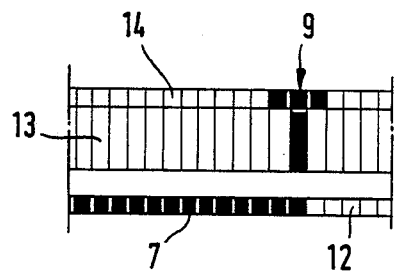
FIG. 7 shows a detail of the quasi-analog display in a first embodiment.
Figure 8:
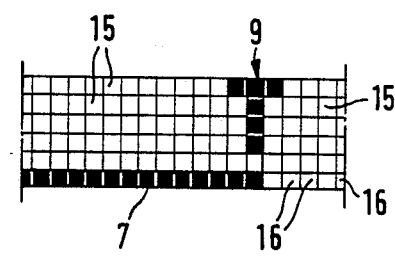
FIG. 8 shows a detail of the quasi-analog display in a second embodiment.

FIGS. 7, 8 show in two different embodiments how the activation of the "T" symbols can be performed. Each figure shows an enlarged section of the quasi-analog display of each embodiment. In FIG. 7, adjacent activatable points 12 can be recognized which form a first horizontal band (bar) for the quasi-analog display. Adjacent vertical, activatable lines 13 are located above them and, directly above the latter, activatable points 14 which also help form a second horizontal band. A "T" symbol is displayed by activating a line 13 and three points 14 in a manner which is symmetric thereto, as is indicated in FIG. 7 by the segments in black. The "T" symbol can be displaced quasi-analogously with the same step width as band 7. In order to represent the scale, one line 13 can be activated by itself (short scale lines) or together with points 14 located above it (long scale line).

In the embodiment of FIG. 8, the analog display is formed by a plurality of small squares 15 which can be activated individually. These displays are generally known as matrix displays or a graphic displays, so that their basic operation does not have to be explained here. The band for the quasi-analog display is formed by the lowest row of points 16, the second row (from the bottom) always remains deactivated and the third to the sixth row are used to display the "T" symbol and, optionally, the scale. There is, of course, more flexibility in the selection of the line length of the scale in this embodiment than in the embodiment of FIG. 7 since scale lines are possible in three line lengths and scale points. It is thus the horizontal bar representation of gross weight in relation to the tare symbol position on the same horizontal quantification that is the gist of the invention.

The arrangement of the parts of the display shown in the figures is of course merely one possible embodiment within the scope of the invention. In distinction to the figures, the "T" symbol can also be located e.g. directly under the horizontal band (bar) of the quasi-analog display; or the digital display can be located above the analog display instead of under it; or the digital display can likewise be built up from individual points so that both the quasi-analog display and the digital display can be realized on a single matrix display. In the same manner, the scale for the quasi-analog display can be designed to be rough or finer than that which is shown in the figures. The display can of course be designed in any known technique, e.g. with fluorescent technique or light-emitting diode technique or with LCD technique. The control and activation of the individual segments and the associated electronics are known to any electronic expert, so that they do not have to be discussed here.

FIG. 9 shows the functional description of the system shown in FIG. 1 with part 17 being the referenced digital signal processing unit and containing a tare memory whose value is entered by said digital signal processing unit by activating tare key 4.

What is claimed is:

1. An electronic balance system comprising:
a balance weighing device producing a signal indicative of weight placed thereupon,
a digital display,
a quasi-analog display,
said display comprising
a horizontal band of activatable points,
said points having a full, faded, or null display intensity,
a digital signal processing unit having a tare memory,
a tare actuation button,
said band including a displayable horizontal bar and a displayable tare symbol,
said bar and said symbol displayed by separate activation of suitable of said activatable points
and wherein
said processing unit causes
  (a) said digital display to digitally display (gross weight - tare weight),
said tare weight being a gross weight measured and stored in said tare memory upon actuation of said tare actuation button, and
  (b) said quasi-analog display to:
    (i) display said tare symbol at approximately a horizontal position of ratio of $$\frac{\text{tare weight}}{\text{full scale weight}}$$

from the left of said horizontal band from a time substantially starting with actuation of said tare actuation button, and (ii) display said horizontal bar to approximately a horizontal position of $$\frac{\text{gross weight}}{\text{full scale weight}}$$

from the left of said horizontal band.

2. An electronic balance system according to claim 1 wherein said tare symbol is of "T" appearance displayed upon activation of suitable activatable points of said band by said tare actuation button.

3. An electronic balance system according to claim 1, wherein said tare symbol is of "T" appearance, said band comprising:
a first set of horizontally adjacent vertical line activatable points,
a second set of adjacent activatable points adjacent to and superior in vertical position to said vertical line activatable points,
each of said vertical line points having a length greater than a side dimension of one of said second points,
with said tare symbol displayed upon activation of one of said second set with several of said second set with at least one of said second set being vertically adjacent to one of said activated first set.

4. An electronic balance system according to cliam 1 wherein suitable activatable points of said band are activated to display a horizontal scale indication.

5. The invention of claim 4 wherein said activated points represent a periodic function.

6. The invention of claim 5 wherein said periodic function is linear.

7. The invention of claim 4 wherein said suitable activatable points displaying said scale indication which are horizontally at or near said displayed tare symbol are not at full display intensity.

8. An electronic balance system comprising:
a balance weighing device producing a signal indicative of weight placed thereupon,
a digital display,
a quasi-analog display,
said display comprising
two horizontal bands of activatable point,
said points having a full, faded, or null display intensity,
a digital signal processing unit having a tare memory,
a tare actuation button,
said band including a displayable horizontal bar and a displayable tare symbol,
said bar and said symbol displayed by separate activation of suitable of said activatable points
and wherein
said processing unit causes
(a) said digital display to digitally display (gross weight - tare weight),
said tare weight being a gross weight measured and stored in said tare memory upon actuation of said tare actuation button, and
(b) said quasi-analog display to:
(i) display said tare symbol at approximately a horizontal position of ratio of from the left of $$\frac{\text{tare weight}}{\text{full scale weight}}$$

said first horizontal band from a time substantially starting with actuation of said tare actuation button, and
(ii) display said horizontal bar to approximately a horizontal position of $$\frac{\text{gross weight}}{\text{full scale weight}}$$

from the left of said horizontal band.

9. The invention of claim 8 wherein suitable activatable points of said first horizontal band are activated to display a horizontal scale indication.

* * * * *